SELF-TIMED REGENERATIVE REPEATERS FOR PCM

Filed Dec. 9, 1958 2 Sheets-Sheet 1

INVENTOR
O. E. DE LANGE
BY
ATTORNEY

April 25, 1961 O. E. DE LANGE 2,981,796

SELF-TIMED REGENERATIVE REPEATERS FOR PCM

Filed Dec. 9, 1958 2 Sheets-Sheet 2

INVENTOR
O. E. DE LANGE
BY
ATTORNEY 2,981,796

SELF-TIMED REGENERATIVE REPEATERS FOR PCM

Owen E. De Lange, Rumson, N.J., assignor to Bell Telephone Laboratories, Incorporated, New York, N.Y., a corporation of New York Filed Dec. 9, 1958, Ser. No. 779,213

15 Claims. (Cl. 178—70)

This invention relates to repeaters for communication systems and more particularly to self-timed regenerative repeaters for use in multilink relay systems in which pulse code modulation is employed.

One of the major problems in the design of long distance communication systems has been the reduction of noise or distortion that is picked up along the transmission path or introduced by associated equipment. This is principally because of the cumulative build-up of noise and other transmission impairments within each of the many repeater sections necessary over the long distances. In all of the conventional systems in which all of the amplitude or frequency variations of the message signal are continuously transmitted, the repeaters must have exceptionally low distortion so that the signals may be propagated through a large number of repeaters without too much deformation. One particular system which has been developed to eliminate or minimize effective noise pick-up in the transmission path is that in which pulse code modulation is employed. The chief advantage of a transmission system employing pulse code modulation resides in the possibility of completely regenerating the pulses representing the message to be transmitted at intervals along the route of transmission and thus preventing the accumulation of distortion due to noise, bandwidth limitations and other effects. It is obvious that a very important part of a pulse code modulation system is therefore the regenerative repeater which is employed.

In a regenerative repeater the received pulse train is sampled at proper fixed intervals determined by the maximum repetition rate of the pulses to determine whether a pulse is present at each possible pulse position. Each time a pulse is detected in the received pulse train, a new pulse is transmitted the shape of which is independent of the shape of the input pulse to the particular regenerative repeater. Thus, distortion from noise and other system imperfections is completely removed provided the maximum distortion in the applied pulses is held within proper limits, that is, providing the presence or absence of a pulse can be distinguished at the input of the repeater. Errors in the form of pulses in place of spaces and errors in the code level of pulses in systems other than binary are encountered when these limits are exceeded. In a practical repeater chain there will be an accumulation of errors in proportion to the number of repeater sections connected in tandem.

The regeneration of pulse code modulation pulses consists of two functions; first, the removal of undesired amplitude effects, and second the restoration of each pulse to its proper position in time. The first of these functions is a result of the mere fact of regeneration while the second requires the production of accurate timing pulses or clock pulses at each repeater. These clock pulses, which are caused to occur at intervals determined by the maximum repetition rate of the pulses, gate or time the production of all signal pulses transmitted from the repeater.

There are two basic methods for providing timing information to permit the generation of clock pulses at a regenerative repeater. In the first method this information is transmitted over a second channel. In the second, it is derived from the incoming train of signal pulses. Systems employing the first method are termed "externally-timed systems" and those of the second type are termed "self-timed systems." In either of the above systems, the timing wave is affected by noise. However, noise is not the only source of timing difficulty in a self-timed system.

In a chain of self-timed regenerative repeaters, the timing wave for each repeater can be derived by applying the envelopes of the pulses in the incoming code groups to a narrow band filter tuned to the pulse-repetition frequency (the repetition frequency of the pulses if all possible pulses are present in each code group). The desired output of the filter is a sine wave of the pulse-repetition frequency. From this sine wave the clock pulses mentioned above are derived.

Now as the signal pulse pattern changes in accordance with the intelligence which is represented by the code groups received, the sine wave output of the filter at the pulse-repetition frequency changes in amplitude. The output sine wave is greatest in intervals where all pulses are present and in their highest code level. For most physical repeaters the phase of the timing wave also changes with the change of pulse patterns. Such a defect exists because of amplitude-to-phase conversion in limiters or other nonlinear elements, phase changes due to finite width of the pulses applied to the timing circuit, and phase shifts caused by detuning of the timing circuits and other circuit phenomena. Although the results of phase change are somewhat similar to those produced by noise, they differ in important respects. Except for detuning effects, it is very probable that the phase deviations will be in the same direction at each repeater, so that deviations add directly rather than on a random basis. It is also possible, but highly improbable, that deviations due to detuning also add directly. These effects are not inherent in timing circuits and might conceivably be reduced to negligible value by proper design of the timing equipment.

Changes of pulse pattern can also produce another adverse effect in regenerative repeaters. As stated above, it must be determined at a regenerative repeater whether there is a pulse present at the input. This may be accomplished in many ways and as an illustration this may be performed by setting the triggering level of a monostable multivibrator to a predetermined value. In a binary code regenerative repeater this point or level could be chosen to be the voltage level half way between the standard peak voltage level of a pulse and zero. However, as the average number of pulses per unit time changes, this level appears to be displaced from the correct value, in a manner dependent upon the type of decision circuit, thus increasing vulnerability to noise.

Therefore it is an object of this invention to improve regenerative repeaters for pulse code modulation systems.

Another object of this invention is to render regenerative repeaters insensitive to changes in incoming pulse patterns and to other effects which produce phase deviations in the signals from which timing waves are derived.

The above-mentioned defects are not inherent, and one solution to the phase deviation problem would be to design the circuits in such a way that only tolerable amounts of phase deviation will take place. In view of the very small values of phase deviation which can be tolerated in a multirepeater system, and since some deviation is produced in each of a number of different parts of a circuit, this would prove so difficult as to be impracticable and costly. However, and according to the invention, one can provide a controllable inverse effect which can substantially balance out phase deviation and also decision level changes.

In accordance with one feature of the invention an equalizer is placed at one point in the repeater and is adjusted to balance the phase deviation produced in all the circuits of that repeater. In such an arrangement it is relatively simple to obtain a significant improvement. As has been previously stated, the amplitude of the timing wave will vary with the number of pulses per sample and with the code level of the pulses. Under the same conditions the timing wave phase will also change in proportion to the code level and the number of pulses per sample. Therefore, if there is inserted in the timing circuit an element whose transmission characteristic is the proper function of the timing wave amplitude, it is possible to balance out phase deviations resulting from changes of pulse pattern. Since changes of pulse pattern produce other adverse effects in regenerative repeaters, namely the changing of the decision level, it is possible to also balance out these effects by utilizing the timing wave.

The above and other features of the invention can be more readily perceived from the following illustrative embodiments as shown in the accompanying drawings in which.

Figure 1:
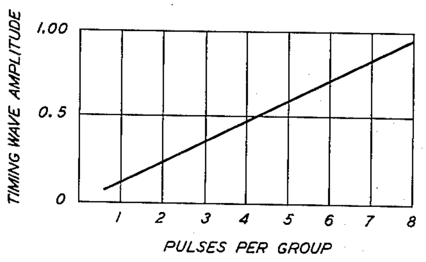
Fig. 1 is a graph illustrative of how the amplitude of the recovered timing wave varies with the number of incoming pulses.

In Fig. 1 there is shown a graph showing the relative timing wave amplitude versus the pulses per received code group where the maximum number of pulses per group is eight and the pulse pattern is repetitious. Fig. 1 shows merely that the more pulses that are fed to the timing wave filter, the greater the amplitude of the timing wave output. When the average number of pulses per group varies, the timing wave amplitude will also vary proportionally.

Figure 2:
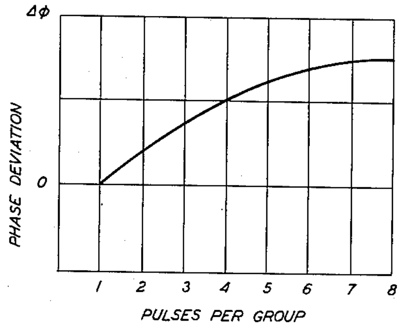
Fig. 2 is a graph illustrative of how the phase of the timing wave might change with the incoming pulse patterns at a hypothetical repeater.

Fig. 2 is a graph illustrative of a characteristic of a hypothetical regenerative repeater in which the phase of the timing wave varies with the changes in the pulses per group. Since phase deviation due to changes in pulse pattern is not inherent in any timing circuit but is merely the result of the various parameters of the timing circuit, as has been previously stated, every regenerative repeater will have its own particular and peculiar characteristic phase deviation as a function of the number of pulses per group.

Figure 3:
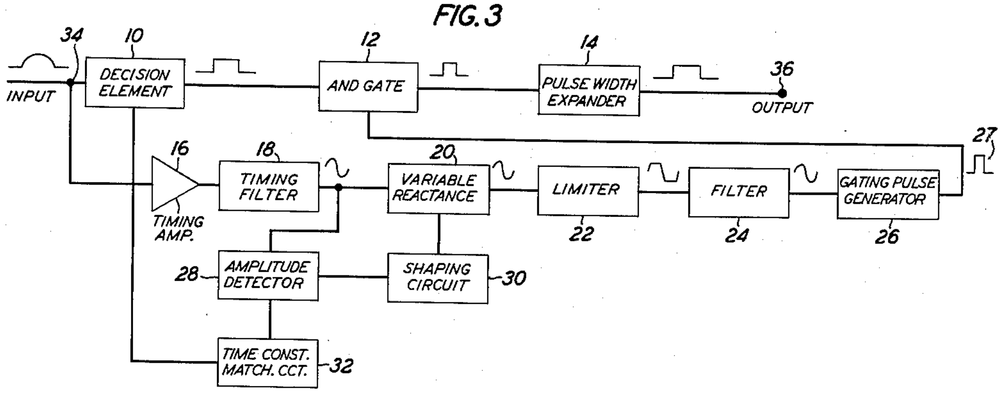
Fig. 3 is a block diagram of a regenerative repeater illustrating one embodiment of the applicant's invention.

In Fig. 3 there is illustrated in block diagram form one embodiment of the applicant's invention. Although, for the sake of simplicity, Fig. 3 is illustrative of a binary regenerative repeater, the invention is not restricted to a repeater for binary type codes and is equally applicable to systems employing more complicated permutation codes. A pulse, indicated as having suffered considerable degradation, enters the regenerative repeater at point 34 and divides into two paths. The pulse entering the upper path, which includes the decision element 10, the AND gate 12, and the pulse width expander (or pulse stretcher) 14, is reshaped by the regenerative repeater for retransmission, while the pulse entering the lower path is used for control of the reshaping or regeneration of the pulse entering the upper path. This pulse entering the lower path is applied to a timing amplifier 16, a timing filter 18, a variable reactance 20, a limiter 22, a filter 24, and a gating pulse generator 26. The output of the timing filter 18 is also applied to an amplitude detector 28, the output of which is applied to a shaping circuit 30. The output of circuit 30 is applied to the variable reactance 20 which adjusts the phase of the timing wave. The output of amplitude detector 28 is also fed to a time-constant-matching circuit 32 which applies a control voltage varying in proportion to the change in the timing wave amplitude (which is proportional to the change in the pulse patterns) to the decision element 10 which adjusts and maintains the decision level of the decision element 10 at a constant value.

The functions of the various elements may now be considered in more detail. The signal entering the upper path first encounters the decision element 10, the function of which is to determine whether or not there is a pulse present at that particular time. Decision element 10 of the system is arranged for binary code signals represented by "on" and "off" pulses and may be biased to a point about half way between standard peak amplitude of a pulse and the zero level of the pulse. Obviously the nature of the decision element will depend upon the characteristics of the code representation employed. A wide variety of such elements is available in the art. If the decision element 10 decides that there is no pulse at the input to the decision element, there will be no output. However, if the decision element determines that a pulse is present, the output will be a predetermined standard level and the output will continue at that standard level until the input pulse voltage decreases beyond a certain predetermined level.

The effect of the decision element upon a signal may be understood by a comparison of the representative input and output pulses as shown in Fig. 3. It is assumed in these representations that the input pulse is of sufficient amplitude to cause an output pulse. If the decision element 10 decides that there is a pulse present at its input, an output pulse is generated and transmitted to the AND gate 12. The function of the AND gate 12 is to re-time the pulse. The AND gate 12 will allow a pulse to emerge from its output only when there is a coincidence of a pulse from the gating pulse generator 26 and a pulse from the decision element 10. The pulse 27 emerging from the gating pulse generator 26 in Fig. 3 is a comparatively narrow pulse and it is centered about the time position which the incoming signal pulse should have occupied in the absence of distortion along the transmission path. The pulse from the AND gate 12 ordinarily will be narrower than the required output pulse of the regenerative repeater itself to insure precise timing of the regenerated pulses. Because the pulse emerging from the AND gate 12 does not have the pulse width of the originally transmitted pulses it is acted upon by the pulse width expander 14 which expands the pulse to a predetermined standard width. The output of pulse width expander 14 is a completely re-timed pulse having a predetermined amplitude and a determined time position.

It can be seen that if the decision element 10 does not distinguish properly between the presence and absence of an input pulse, there will obviously be errors in the pulse pattern transmitted from the output of the repeater. In certain types of decision elements, the point or level at which the decision element makes its decision will vary with the number of pulses that enter the system therefore subjecting the repeater to a greater possibility of error. Also, as has been stated and as can be readily seen, if the gating pulse generator 26 delivers a pulse which has its phase deviated because of the phase deviation of the output of the timing filter 18, then the time position of the output pulse will also be subject to error.

In the lower section of the binary regenerative repeater illustrated in Fig. 3 there are provided, according to the invention, controls which will adjust for the variations in the decision level of element 10 and for the variations in the time position of the output pulse of the gating pulse generator 26 due to the changes in incoming pulse pattern. It has been stated that these variations are due to changes in incoming pulse pattern. In reality the variations are due to the presence or absence of each pulse, or more broadly stated these variations are due to changes in the energy content of the pulse array. If for example the pulse patterns were repetitious, then the phase and decision level deviations would be a constant and could be adjusted for by some manual control. Of course, no varying intelligence could be transmitted if the pulse patterns were repetitious.

Now, following a pulse as it enters the lower path from the input section to the repeater, we see that the pulse enters amplifier 16 and is amplified and transmitted to the timing filter 18 which is tuned to the pulse repetition frequency or the frequency of pulses if every pulse is present in every pulse position or time slot. The amplitude of the sine wave emerging from the timing filter 18 varies with the number of pulses entering the timing filter. A sine wave changing in amplitude can be considered as an amplitude modulated wave and therefore the output of the timing filter 18 may be transmitted to an amplitude detector 28 which detects the amplitude variations in the timing wave and transmits the control voltage thus produced to a shaping circuit 30. The shaping circuit 30 is adjusted to the particular regenerative repeater in which it is to be employed. Each regenerative repeater will have a phase deviation with changing pulse pattern peculiar to itself. Therefore, the shaping circuit 30 will be adapted to have an output amplitude versus input amplitude characteristic corresponding to the phase deviation of the particular regenerative repeater involved.

Figure 5:
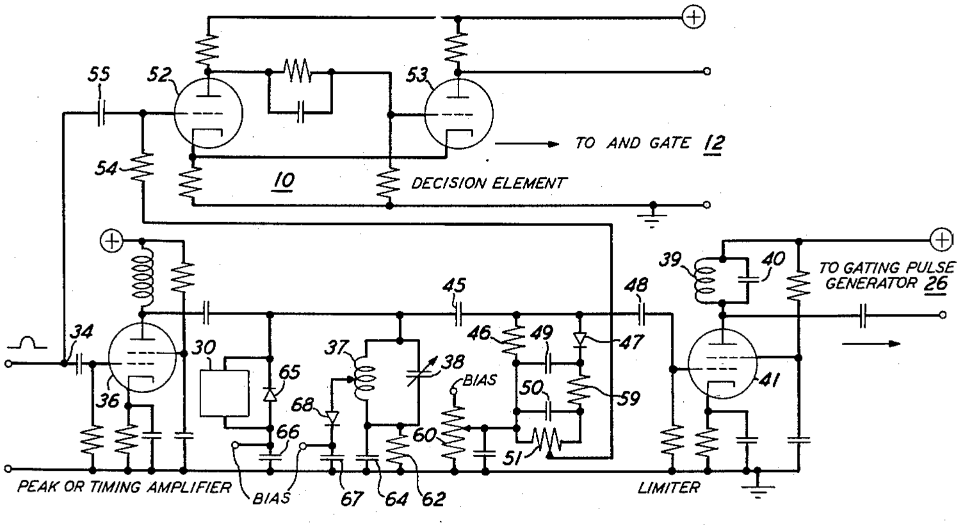
Fig. 5 is a schematic diagram of one part of the circuit shown in Fig. 3.

The output of the shaping circuit 30 is then transmitted to the variable reactance 20. The variable reactance 20 can take any one of a number of forms such as a reactance tube, a saturable inductor, or a variable-capacitance diode circuit such as illustrated in Fig. 5. The function of the variable reactance 20 is to introduce a phase change in the wave appearing at the output of the timing filter 18. The control signal from the shaping circuit 30 thus produces a phase change whose magnitude varies depending upon the amplitude of the output of the timing filter and also upon the output of the shaping circuit 30. The output of the variable reactance 20 is a phase adjusted sine wave of frequency equal to the pulse repetition frequency. The output of the variable reactance 20 is then transmitted to a limiter 22. The limiter 22 clips both positive and negative peaks of the sine wave transmitted thereto. The chopped or limited output pulses, illustrated in Fig. 3, are applied to the filter 24. The output of filter 24 which is broadly tuned to the pulse repetition frequency will be a constant amplitude sine wave of the pulse repetition frequency. The output of filter 24 is then applied to control the gating pulse generator 26.

The gating pulse generator 26 produces an output pulse centered about a predetermined time. This particular time could be the point at which the sine wave goes through the zero axis with a positive slope, or any other point. The purpose is to produce a train of short pulses centered in the time slots in which the pulses being regenerated may occur. The output of the gating pulse generator 26 is then fed to the AND gate 12 and provides a timing pulse for the output pulse from decision element 10, to place the pulse in its proper time position.

There is another path which the output of the amplitude detector 28 takes, and that is to the time constant matching circuit 32. The time constant circuit 32 is dependent upon the particular type of decision element which is used in the repeater. In certain types of decision elements, one of which will be described in detail below, the decision level at which the decision element determines that a pulse is present varies with the number and energy content of the incoming pulses. If the variation in the decision level is due to accumulation of energy in a circuit branch which has the ability to store energy, then obviously the variation in the decision level will be a function of the storage ability of that branch, i.e., its time constant. Therefore, in order to eliminiate this effect a voltage of the same amplitude and varying at the same rate is applied to the decision element in opposition to the distortion voltage created by the stored energy.

Figure 4:
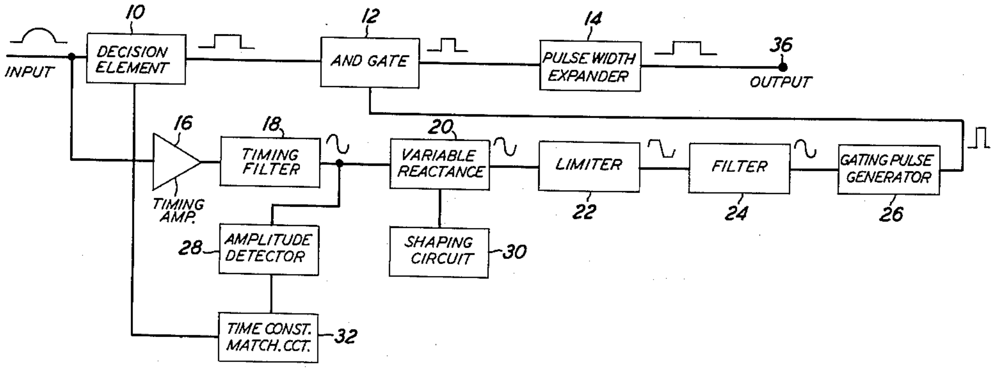
Fig. 4 is a block diagram of a regenerative repeater illustrating another embodiment of the applicant's invention.

Fig. 4 is a block diagram of a regenerative repeater illustrating another embodiment of the applicant's invention. Fig. 4 differs only slightly from Fig. 3 and therefore the same numerals are used to designate corresponding blocks. In fact the only major change is that the control voltage recovered from the output of the timing filter 18 is not used in adjusting the phase of the timing wave. Instead the output of the timing filter 18 itself is used to vary the reactance of the variable reactance 20. This will become clearer when it is explained in detail with respect to Fig. 6.

Fig. 5 illustrates a detailed circuit of one embodiment of portions of the repeater of Fig. 3. In Fig. 3 a separate block block is used to represent each operation of the system. However, in Fig. 5, as will be seen, certain of these operations or functions are sometimes performed simultaneously by the same circuit elements. An input pulse enters point 34 and divides into two paths; one being the upper path to the decision element 10, the other being the lower path to the peak or timing amplifier, which includes the tube 36 and the tank circuit comprising inductor 37 and capacitor 38. This amplifier corresponds to the amplifier 16 of Fig. 3. The general shape of an input pulse having suffered considerable degradation is illustrated next to point 34 in Fig. 5. The tank circuit comprising the inductor 37 and capacitor 38 is a sharply tuned tank circuit and is tuned to the pulse repetition frequency and can be considered as illustrating the timing filter 18 of Fig. 3. Therefore, the voltage appearing across the tank circuit will be of the pulse repetition frequency and will vary in amplitude in proportion to the number of incoming pulses per group. The reactance control circuit consists of resistor 62, diode 65, variable-capacitance diode 68, and capacitors 64, 66, and 67 and can be considered illustrative of the amplitude detector 28 and the variable reactance 20 of Fig. 3.

In Fig. 3 the shaping circuit, 30, is shown as a separate element largely for the purpose of illustrating the need to perform the shaping function if the highest degree of phase compensation is to be obtained. In the detail circuit of Fig. 5 it is difficult to entirely separate the shaping function since it is distributed among a number of elements. For example shaping is determined by the voltage-current characteristics of diode 65, the voltage-capacitance characteristic of diode 68, the point at which diode 68 is tapped on inductance 37, and so forth. Shaping is employed to insure that the phase change introduced by the variable reactance varies proportionally with the change in amplitude of the output of the timing filter in the same manner but opposite phase direction as the unwanted phase deviation varies with the pulses per group of the input signal. Fig. 2 illustrates the characteristic of the unwanted phase deviation versus pulses per group for a hypothetical repeater. It can be seen that any shaping circuit would have to be designed with the knowledge of the particular phase deviation characteristics of the repeater in which it is employed. Therefore the details of such a circuit are omitted since they are only a matter of design which would be known to one skilled in the art.

In Fig. 3 it was assumed that the variable reactance 20 would vary the phase of the sine wave output of the timing filter directly in proportion to the output amplitude of the shaping circuit 30. This need not be the case in the embodiment of Fig. 3 illustrated in Fig. 5. Therefore this also must be considered in the design of the shaping circuit 30.

The reactance control circuit is shunted across the tank circuit comprising inductor 37 and capacitor 38. Any variation in the reactance of the reactance control circuit will alter the tuning of the tank circuit. If the tank circuit is detuned a phase shift is introduced into the voltage across the tank, which is the timing wave. The reactance control circuit is arranged to vary in impedance in proportion to the change in amplitude of the timing wave as will now be explained.

Capacitors 64, 66 and 67 are comparatively large and effectively tie the elements they are associated with at ground potential for frequencies in the range of the pulse repetition frequency. The diode 65 rectifies the output of the peak amplifier and the variation in amplitude or envelope voltage of the output of the peak amplifier (the output of the peak amplifier being the voltage appearing across the tank circuit comprising inductance 37 and capacitor 38) appears as a variation in the voltage across resistor 62. Diode 68 is back biased, that is, biased in a direction in which less current flows by an adjustable bias source indicated but not shown. Diode 68 is a variable-capacitance type diode and its capacitance can be altered by altering the back bias voltage. A variable-capacitance diode, that is, a diode which can be utilized as a variable capacitance by altering the back bias across the diode is know in the art and its principle of operation therefore will not be explained. The recovered voltage or the envelope voltage appearing across resistor 62 is applied to the variable-capacitance diode 68 through the tap on inductance 37. This will cause the capacitance of variable-capacitance diode 68 to vary according to the output of the peak amplifier. The variation in capacitance of diode 68 varies the tuning of the tank comprising inductance 37 and capacitor 38. Hence if the output of the peak amplifier changes, a voltage is recovered which varies proportionally to this change, and which introduces a phase change in the output voltage of the peak amplifier. The direction of the change of impedance (either increasing or decreasing) of the reactance control circuit for a given change of amplitude of the output of the peak amplifier is determined by whether the capacitance of variable-capacitance diode 68 is increased or decreased and this can be altered by changing the polarity of either diode 65 or diode 68. The magnitude of the effective reactance change at the tank circuit, produced by a given change of control diode capacitance, can be altered by changing the position of the tap on inductance 37.

The output wave form of the tank circuit including inductance 37 and capacitance 38 is fed to the grid of the tube 41. The tube 41 is illustrative of the limiter 22 of Fig. 3. The tuned circuit including inductance 39 and capacitor 40 is representative of the filter 24 of Fig. 3. The design of the limiter circuit including the amplifier 41 should be such as to provide both positive and negative limiting of the input wave. The tuned circuit including inductance 39 and capacitor 40 in the limiter plate circuit should be provided to discriminate against harmonics of the pulse repetition frequency (or the timing wave) but should be broad enough to have negligible effect upon the phase of the timing wave. The output sine wave transmitted to the gating pulse generator 26 will be of the pulse repetition frequency and of a constant amplitude regardless of the amplitude of the incoming wave form. The gating pulse generator 26 is indicated but not shown. The particular form of the gating pulse generator 26 is not essential in this invention. What has been produced at the output of the tank circuit including inductances 39 and 40 is a timing wave of constant amplitude in which the phase deviation of the input signal has been eliminated.

The output of the gating pulse generator 26 is then sent to the AND gate 12 as illustrated in Fig. 3. Returning now to point 34 where the original pulse entered two paths, let us now follow the pulse as it enters the upper path and is fed to the decision element 10. The decision element 10, illustrated in Fig. 5, is what is known as a "Schmitt" trigger circuit. An explanation of the principle of operation of this circuit can be found in the Journal of Scientific Instruments, January 1938, page 24. The invention is not limited to a decision element comprising a "Schmitt" trigger circuit as any equivalent circuit can be substituted for this trigger circuit. In the circuit shown, tube 52 is normally cut off and tube 53 is normally conducting. When the input voltage on the grid of tube 52 reaches the cut-on value, tube 52 begins to conduct and tube 53 begins to become extinguished. This occurs very rapidly due to positive feedback. Tube 52 will remain conducting as long as the potential on the grid of tube 52 remains above a critical point. As soon as the voltage on the grid of tube 52 falls below the critical voltage, tube 52 becomes extinguished and tube 53 begins to conduct. This critical level which initiates the conduction of tube 53 and at which tube 52 becomes extinguished is the decision level and is adjusted to be one-half the amplitude of a standard pulse. It can be seen that if this critical slicing level varies due to any factors, the possibility of the decision element making mistakes is increased. In this particular example, due to the time constant of the capacitor 55 and resistor 54, the critical voltage at which tube 52 will begin to conduct varies in dependence upon the number of pulses entering the system, or in other words, the decision level is determined by the energy stored in the R-C circuit. Therefore, the greater the variation in the average number of pulses, the greater the variation in the decision level or the point at which tube 52 will begin to conduct. In order to compensate for this effect, a time constant matching circuit 32, as indicated in Fig. 3, is provided to produce a converse or compensating effect. That is, a voltage is applied to the grid of tube 52 which is intended to compensate for the distortion voltage which appears at the grid of tube 52 due to the R-C time constant of capacitor 55 and resistor 54. An R-C network such as that composed of capacitor 55 and resistor 54 does not pass all frequencies equally well. All frequencies below cut-off frequency $f_c$ $$\left(\text{where } f_c=\frac{1}{2\pi RC}\right)$$

are attenuated, and for this reason the voltage wave at the tube 52 side of capacitor 55 will be different from the voltage wave at the left side or input side of capacitor 55. The difference in wave form depends upon the low frequency content of the input wave and hence upon the pulse pattern as previously stated. It is this resulting distortion of the input wave which causes wandering of the decision level. If the input circuit were a transformer similar distortion, also due to the attenuation of low frequency components, would occur. By means of the time constant matching circuit 32 we are able to resupply the low frequency components removed by the R-C coupling circuit comprising capacitor 55 and resistor 54. In other words a voltage opposite in polarity to the distortion voltage is supplied to cancel the distortion.

In one convenient circuit arrangement for this purpose a second amplitude detector is provided for use with the time constant matching circuit. This is a matter of circuit design. The time constant matching circuit 32 and the significant portion of amplitude detector 28 of Fig. 3 are represented in Fig. 5 as comprising the network including the diode 47, the capacitors 49 and 50, the resistors 59, 51, and 46, and the adjustable resistor 60. The grid of tube 52 is biased to a fixed potential through the resistor 60. It can be seen that the greater the amplitude of the output wave form of the tank circuit including the inductance 37 and capacitance 38, the greater the voltage that would be built up across resistor 51. The time constant of the circuit just discussed is largely determined by the values of the capacitors 49 and 50 and the resistor 59, and must be adjusted to match the time constant of the R-C circuit at the input to the "Schmitt" trigger circuit. Because of the insertion of the detector with the time constant matching circuit previously described, the decision level of the "Schmitt" trigger circuit will not change appreciably with variations in incoming pulse patterns and consequently all input pulses will be sampled at the preselected level.

The output pulse from the "Schmitt" trigger circuit which appears at the plate of tube 53 is transmitted to the AND gate 12 as illustrated in Fig. 3 and upon coincident occurrence of a timing pulse from the gating pulse generator a properly shaped pulse is forwarded to the pulse width expander 14.

Figure 6:
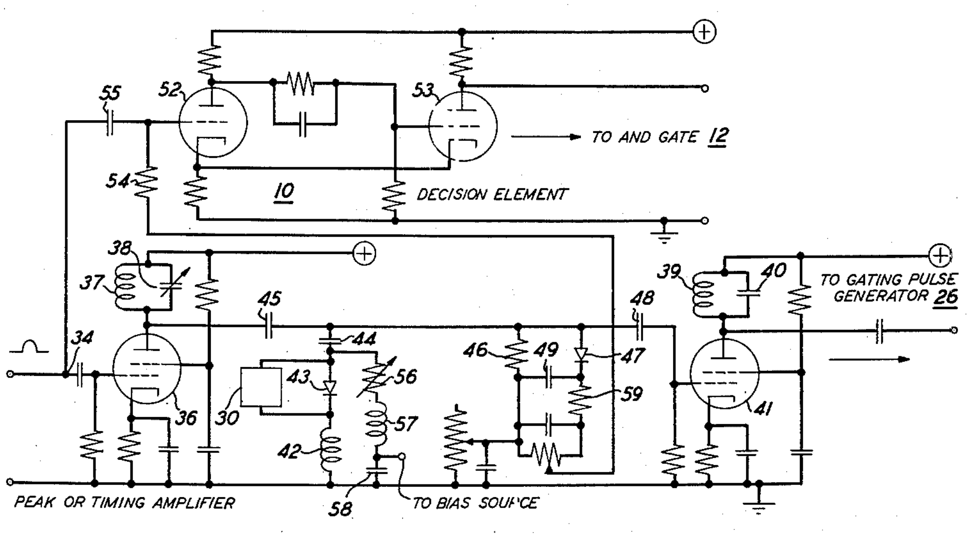
Fig. 6 is a schematic diagram of one part of the circuit shown in Fig. 4.

Fig. 6 is a schematic diagram illustrative of the embodiment of the circuit shown in Fig. 4. Fig. 6 differs from Fig. 5 in the "reactance control circuit." The same numerals are used in Fig. 6 as are used to designate corresponding elements in Fig. 5 and elements with corresponding numerals perform the same functions in the same manner. The essential difference between Fig. 5 and Fig. 6 is that a control voltage, recovered from the envelope of the timing filter, is not employed to control the variable reactance as is shown in Fig. 5 but the output voltage of the timing filter is used directly to control a variable reactance.

The reactance control circuit of Fig. 6 comprises inductance 42, the diode 43, and the capacitor 44 and can be considered as illustrating the variable reactance 20 of Fig. 4. Again, as with the explanation of Fig. 5 a shaping circuit 30 is indicated. The shaping circuit 30 will be a matter of design depending upon the unwanted phase deviation characteristic of the particular repeater and the induced phase deviation versus amplitude of the output of the peak amplifier (the timing wave). This again is a matter of design which can be performed by those skilled in the art.

An adjustable bias is supplied to the diode 43 through the inductance 57 and variable resistor 56 from a source indicated but not shown. The branch containing resistor 56, inductor 57, and capacitor 58 is of a very high impedance at the pulse repetition frequency as compared to the branch including diode 43 and inductor 42. Its main and specific purpose is to supply a bias voltage to the diode 43 which partially determines the average impedance of the diode 43. The branch including inductance 42 is effectively shunted across inductance 37 and capacitor 38. It can be seen that the greater the amplitude of the voltage wave applied to the diode 43, the lower the impedance of this diode will become thereby detuning the tank circuit in proportion to the amplitude of the wave across the tank circuit. This detuning introduces a phase deviation in the output wave of the tank circuit. Fig. 4 shows a separate block to represent each operation of the system. There is shown a timing filter 18 and a variable reactance 20 which represent the individual operations made upon the timing wave in order to compensate for any phase deviations in the timing wave. In Fig. 6, however, these operations do not proceed separately and distinctly but are simultaneous. The larger the amplitude of the timing wave, the greater the effect on the reactance control circuit consisting of inductance 42, the diode 43, and capacitor 44 which can be considered as representing the variable reactance 20 of Fig. 3. This reactance change detunes the timing filter tank circuit and introduces the desired phase compensation. The phase deviation characteristic can be adjusted by adjusting the size of inductance 42, the resistor 56, the bias voltage, and other controllable factors. If a capacitive reactance is required instead of an inductive reactance as shown, the value of inductance 42 can be reduced to zero by connecting the diode directly to ground and therefore capacitor 44 would become the controlling reactance and in this case capacitor 44 would probably be made somewhat smaller than capaictor 38.

In conclusion it should be noted that the invention can be employed to remove not only the locally generated deviations due to changes of pulse pattern but also the residual deviations due to all of the preceding repeaters. This could be accomplished by employing a circuit in accordance with applicant's invention at the receiving terminal and adjusting it to provide minimum distortion for the complete transmission system.

What is claimed is:

1. In a self-timed regenerative repeater for signals comprising pulses where the average number and energy content of said pulses vary in a substantially random manner, means for applying to the input of said repeater a plurality of said pulses, filter means for deriving a timing wave from the incoming pulses which varies in amplitude in proportion to the number and energy content of said incoming pulses, means for varying the reactance of said filter in response to the amplitude of said timing wave to maintain the phase of said timing wave substantially constant regardless of variation in the number and energy content of said incoming pulses, detector means for deriving a control voltage from said timing wave which varies with the changes in amplitude of said timing wave, a decision element which produces an output pulse if the incoming pulse exceeds a predetermined amplitude having a reactive input impedance, said reactive input impedance causing energy to be temporarily stored therein proportional to the energy contained and the rate of appearance of said incoming pulses thereby varying the amplitude level of said pulses at which said decision element will produce an output pulse, circuit means driven by said control voltage for generating an output voltage which will vary in a corresponding manner as the energy stored in said input, and means for applying said output voltage in series to said input to compensate for said stored energy.

2. In a self-timed regenerative repeater for signals comprising pulses where the number and energy content of said pulses vary in an essentially random manner, means for applying to the input of said repeater a plurality of said pulses, filter means tuned to the maximum pulse-repetition rate for deriving a timing wave from said incoming pulses, means for deriving a control voltage from said timing wave which varies with the changes in said incoming pulses, and means for impressing said timing wave on a circuit having a reactance varied in accordance with said control voltage whereby any phase change introduced into said timing wave due to the change in incoming pulses is compensated.

3. In a self-timed regenerative repeater for signals comprising code groups of pulses where the number and energy content of pulses within a group varies between minimum and maximum limits in a substantially random manner, means for applying to the input of said repeater a plurality of said pulse groups, filter means for deriving a timing wave from said incoming pulses, means for deriving a control voltage from said timing wave which varies with the changes in said incoming pulse patterns, and means for varying the reactance of said filter in response to said control voltage to maintain the phase of said timing wave substantially constant regardless of variation in the energy content of said incoming pulse groups.

4. In a self-timed regenerative repeater for signals comprising code groups of pulses where the number and energy content of pulses within a group varies between minimum and maximum limits in a substantially random manner, means for applying to the input of said repeater a plurality of said pulse groups, filter means tuned to the maximum pulse-repetition frequency rate for deriving a timing wave from said incoming pulses, detector means for deriving a control voltage from said timing wave which varies in proportion to the variation in amplitude of said timing wave, a shaping circuit driven by said control voltage and adjusted in accordance with the phase deviation versus pulses-per-group characteristic of the regenerative repeater, and a variable reactance acting on said timing wave and controlled by the output of said shaping circuit, whereby any phase change introduced to said timing wave due to the change in incoming pulse pattern is compensated therefor.

5. In a self-timed regenerative repeater for signals comprising code groups of pulses where the number and energy content of pulses within a group varies between minimum and maximum limits in a substantially random manner, means for applying to the input of said repeater a plurality of said pulse groups, filter means for deriving a timing wave of the maximum pulse-repetition frequency rate from said incoming pulses, amplitude variation detector means for deriving a control voltage from said timing wave which varies in amplitude with the changes in said incoming pulse patterns, a shaping circuit driven by said control voltage having an input-amplitude versus output-amplitude characteristic adjusted to match the phase deviation versus pulses-per-group characteristic of the regenerative repeater, and a variable reactance acting on said timing wave and controlled by the output of said shaping circuit, whereby any phase change introduced into said timing wave due to the variations in energy content of the incoming pulses is compensated therefor.

6. In a self-timed regenerative repeater for signals comprising code groups of pulses where the number and energy content of pulses within a group varies between minimum and maximum limits in a substantially random manner, means for applying to the input of said repeater a plurality of said pulse groups, filter means tuned to the maximum pulse-repetition frequency rate for deriving a timing wave from said incoming pulses, rectifier means for deriving a control voltage from said timing wave which varies with the changes in amplitude of said timing wave, and means for varying the reactance of said filter in response to said control voltage to maintain the phase of said timing wave substantially constant regardless of variation in the energy content of said incoming pulse groups.

7. In a self-timed regenerative repeater for signals comprising code groups of pulses where the number and energy content of pulses within a group varies between minimum and maximum limits in a substantially random manner, means for applying to the input of said repeater a plurality of said pulse groups, filter means for deriving a timing wave of a frequency equal to the maximum pulse repetition rate of said incoming pulses, detector means for deriving a control voltage from said timing wave which varies with the changes in amplitude of said timing wave, decision means which produces an output pulse in response to an incoming pulse exceeding a predetermined amplitude having a reactive input impedance, said reactive input causing energy to be temporarily stored therein in proportion to the number and energy content of said pulse groups thereby varying the amplitude level at which said decision element will produce an output pulse, circuit means driven by said control voltage for generating an output voltage which will vary in a corresponding manner as the energy stored in said reactive input, and means for applying said output voltage in series to said reactive input to compensate for said stored energy variation.

8. In a self-timed regenerative repeater for signals comprising code groups of pulses where the number and energy content of pulses within a group varies between minimum and maximum limits in a substantially random manner, means for applying to the input of said repeater a plurality of said pulse groups, filter means for deriving a timing wave of a frequency equal to the maximum pulse-repetition rate from said incoming pulses, means for deriving a control voltage from said timing wave which varies with the energy contained in the incoming pulses, a decision circuit which institutes the regeneration of a new pulse when the input to said decision circuit exceeds a predetermined amplitude and having a capacitive input, said capacitive input causing a voltage to be stored in proportion to the number and energy content of said pulses in said pulse groups which causes said decision element to decide whether a pulse is present at the input to the decision circuit at different levels of input pulse amplitude, circuit means driven by said control voltage for generating an output voltage which will vary in the same manner as the distortion voltage caused by said capacitive input, and means for applying said output voltage in series to said capacitive input to compensate for said distortion voltage.

9. In a self-timed regenerative repeater for signals comprising code groups of pulses where the number and energy content of pulses within a group varies between minimum and maximum limits in a substantially random manner, means for applying to the input of said repeater a plurality of said pulse groups, filter means for deriving a timing wave from the incoming pulses which varies in amplitude in proportion to the number and energy content of said incoming pulses, a shaping circuit having an output-amplitude versus input-amplitude characteristic adjusted to match the phase deviation versus pulses-per-group characteristic of said regenerative repeater, means for applying said timing wave to said shaping circuit, and a variable reactance acting on said timing wave and controlled by the output of said shaping circuit whereby any phase change introduced into said timing wave due to the changes in the energy contained in said incoming pulses is compensated therefor.

10. In a self-timed regenerative repeater for signals comprising code groups of pulses where the number and energy content of pulses within a group varies between minimum and maximum limits in a substantially random manner thereby causing a corresponding phase deviation characteristic of the output pulses, means for applying to the input of said repeater a plurality of said pulse groups, filter means for deriving a timing wave from the incoming pulses which varies in amplitude in proportion to the number and energy content of said incoming pulses, a shaping circuit having an output-amplitude versus input-amplitude characteristic adjusted to match the phase deviation characteristic of said regenerative repeater, means for applying said timing wave to said shaping circuit, and a variable reactance comprising a biased diode acting on said timing wave form and controlled by the output of said shaping circuit whereby any phase change introduced into said timing wave due to the changes in energy contained in said incoming pulses is compensated therefor.

11. In a self-timed regenerative repeater for signals comprising pulses where the number and energy content of said pulses within a group varies in a substantially random manner, means for applying to the input of said repeater a plurality of said pulses, filter means tuned to the frequency corresponding to the maximum pulse-repetition rate for deriving a timing wave from said incoming pulses, said timing wave varying in amplitude in proportion to the total contained energy in said incoming pulses, detector means for deriving a control voltage from said timing wave which varies in amplitude in proportion to the changes in amplitude of said timing wave, a shaping circuit having an output-amplitude versus input-amplitude characteristic adjusted to match the phase deviation versus pulses-per-group characteristic of said regenerative repeater, means for applying said control voltage to said shaping circuit, a variable reactance acting on said timing wave and controlled by the output of said shaping circuit whereby any phase change introduced into said timing wave due to the changes in the energy contained in said incoming pulses is compensated therefor, a decision element which produces an output pulse if the incoming pulse exceeds a predetermined amplitude having a capacitive input impedance, said capacitive input causing energy to be temporarily stored therein proportional to the energy contained and the rate of appearance of said incoming pulses thereby varying the voltage amplitude level at which said decision element will produce an output pulse, circuit means driven by said control voltage for generating an output voltage which will vary in the same manner as the energy stored in said capacitive input, and means for applying said output voltage in series to said capacitive input thereby balancing the effect caused by said capacitive input.

12. In a self-timed regenerative repeater, means for applying to the input of said repeater a plurality of incoming pulses varying in random patterns, filter means tuned to the maximum pulse repetition rate for deriving a timing wave from said incoming pulses, means for deriving a control voltage from the wave form of said timing wave which varies with the changes in said incoming pulse patterns, and a variable reactance acting on said timing wave and controlled by said control voltage whereby any phase change introduced into said timing wave due to the change in incoming pulse patterns is compensated therefor.

13. In a regenerative repeater for pulse trains wherein a phase deviation occurs in accordance with the number and energy content of the trains to be regenerated, a compensating circuit comprising filter means tuned to the pulse repetition frequency for deriving a signal from said pulse trains which varies in amplitude in proportion to the number and energy content of the pulses therein, and reactance means responsive to the amplitude of said signal, the output of said reactance means being identical in frequency to said pulse trains and compensated in phase for said deviation.

14. In a regenerative repeater wherein a phase deviation occurs in accordance with the energy content of the signals to be regenerated, means for applying signals comprising pulses of varying number and energy content to the input of said repeater, filter means tuned to the maximum pulse repetition frequency for deriving a timing voltage from said signals which varies in magnitude in proportion to the energy content thereof, reactance means responsive to varying control voltages to provide predetermined reactive impedance components for the particular control voltages applied, and means for applying said timing voltage as a control voltage to said reactance means, whereby the phase of said timing voltage is altered in response to the reactive impedance encountered therein.

15. In a regenerative repeater having a reactive impedance characteristic that varies in accordance with the energy content of the signals to be regenerated, means for applying input signals comprising pulses of varying number and energy content to said repeater, filter means tuned to the maximum pulse repetition frequency of said input signals for deriving a control voltage, impedance means responsive to said control voltage having a reactive impedance characteristic which is of equal magnitude and of opposite phase with respect to the impedance characteristic of said repeater for establishing a timing signal of zero phase deviation with respect to said input signals, and means for gating said input signals with said timing signal.

References Cited in the file of this patent

UNITED STATES PATENTS

| | | |
|---|---|---|
| 2,613,272 | Terry et al. | Oct. 7, 1952 |
| 2,617,885 | Cutler | Nov. 11, 1952 |